(No Model.)
W. D. COBB.
THILL COUPLING.
No. 501,923. Patented July 25, 1893.
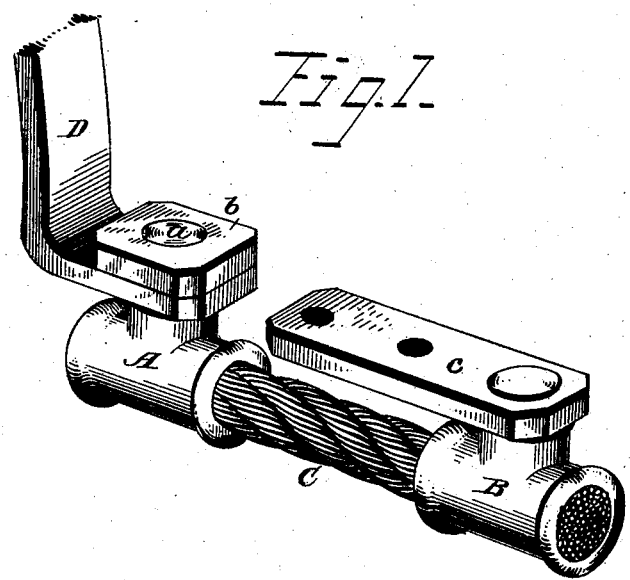
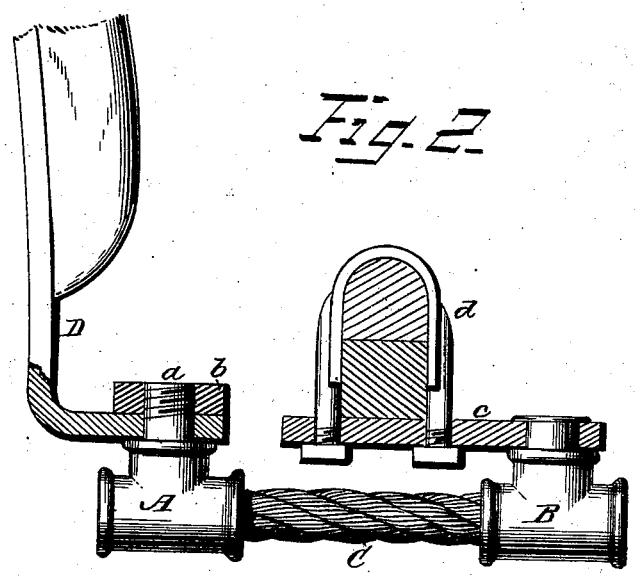
Witnesses
C. J. Williamson
N. J. Freimann.
Inventor
Woodson D. Cobb,
per Chas. H. Forster
Attorney.

UNITED STATES PATENT OFFICE.

WOODSON D. COBB, OF FORT WORTH, TEXAS.

THILL-COUPLING.

SPECIFICATION forming part of Letters Patent No. 501,923, dated July 25, 1893.

Application filed April 3, 1893. Serial No. 468,919. (No model.)

*To all whom it may concern:*

Be it known that I, WOODSON D. COBB, a citizen of the United States, residing at Fort Worth, in the county of Tarrant and State of Texas, have invented certain new and useful Improvements in Thill-Couplings; and I do hereby declare that the following is a full, clear, and exact description of the same, reference being had to the annexed drawings, making a part of this specification, and to the letters of reference marked thereon.

The present invention has for its object to provide a thill-coupling that will possess both strength and durability and be simple in its construction and have the necessary flexibility between the thill and axle without the use or employment of any spring connection, which objects I attain by the construction substantially as shown in the drawings and hereinafter described and claimed.

Figure 1 of the drawings represents a perspective view of a thill coupling embodying my invention; Fig. 2 a side elevation partly in section.

In the accompanying drawings A B represent two thimbles or other suitable means or devices for connecting thereto the ends of a flexible wire rope C, whereby a flexible connection is made between the thill and axle without the employment of a coiled or other form of spring, thus securing the necessary flexibility with increased strength and durability.

The thimble or other device A is preferably formed with a short threaded stud or shank $a$ for connecting thereto the thill-iron D by means of the nut $b$, or any other preferred means may be employed for attaching the thill-iron to the thimble A or other like device upon the end of the wire rope, as may be found desirable.

The thimble B or other device upon the opposite end of the wire rope C is formed with or has connected to it in any suitable manner a clip-plate $c$, or other preferred means for making a connection between the coupling and axle through the medium of the usual clip $d$, and any changes or modifications may be made in the details of construction as would come within ordinary mechanical skill without departing from the principle of my invention.

The employment of the wire rope in place of the usual coiled or other form of spring, enables me to obtain the same flexibility necessary to secure a free vertical movement of the shaft or pole, with the additional advantage of increased strength and durability.

Having now fully described my invention, what I claim as new, and desire to secure by Letters Patent, is—

1. A thill coupling provided with a flexible connection between it and the axle or other part of a vehicle, consisting of a wire rope, substantially as and for the purpose set forth.

2. In a thill-coupling, a wire rope having thimbles or other suitable device upon its ends and means for connecting them to the thill-iron or pole and the axle or other part of a vehicle, substantially as and for the purpose described.

In testimony that I claim the above I have hereunto subscribed my name in the presence of two witnesses.

WOODSON D. COBB.

Witnesses:
L. P. GOODELL,
A. H. JACKSON.